(12) United States Patent
Bradley et al.

(10) Patent No.: US 12,514,403 B2
(45) Date of Patent: Jan. 6, 2026

(54) COUNTERTOP APPLIANCE

(71) Applicant: WHIRLPOOL CORPORATION, Benton Harbor, MI (US)

(72) Inventors: Samuel J. Bradley, Mundelein, IL (US); Pravin R. Shewale, Maharashtra (IN)

(73) Assignee: Whirlpool Corporation, Benton Harbor, MI (US)

( * ) Notice: Subject to any disclaimer, the term of this patent is extended or adjusted under 35 U.S.C. 154(b) by 949 days.

(21) Appl. No.: 17/708,586

(22) Filed: Mar. 30, 2022

(65) Prior Publication Data

US 2023/0309752 A1    Oct. 5, 2023

(51) Int. Cl.
| | |
|---|---|
| *A47J 43/00* | (2006.01) |
| *A47J 43/046* | (2006.01) |
| *A47J 43/06* | (2006.01) |
| *A47J 43/07* | (2006.01) |
| *A47J 43/08* | (2006.01) |

(52) U.S. Cl.
CPC ............ *A47J 43/06* (2013.01); *A47J 43/046* (2013.01); *A47J 43/0716* (2013.01); *A47J 43/085* (2013.01)

(58) Field of Classification Search
CPC ...... A47J 43/06; A47J 43/046; A47J 43/0716; A47J 43/085
See application file for complete search history.

(56) References Cited

U.S. PATENT DOCUMENTS

| | | | |
|---|---|---|---|
| 3,109,949 | A | 11/1963 | Hartwig et al. |
| 6,164,812 | A | 12/2000 | Brezovnik et al. |
| D655,981 | S | 3/2012 | Gursel et al. |
| 8,382,627 | B2 | 2/2013 | Cheung et al. |

(Continued)

FOREIGN PATENT DOCUMENTS

| | | |
|---|---|---|
| EP | 0022465 A1 | 1/1981 |
| EP | 2471425 A1 | 7/2012 |

(Continued)

OTHER PUBLICATIONS https://www.sharkninja.com/ninja-professional-plus-kitchen-system-with-auto-iq/BN801.html The SharkNinja Family, "Ninja® Professional Plus Kitchen System with Auto-iQ®," accessed via website on Nov. 23, 2021.

*Primary Examiner* — Anshu Bhatia
(74) *Attorney, Agent, or Firm* — Price Heneveld LLP

(57) ABSTRACT

A countertop appliance includes a base, a drive shaft, a first coupler, a first engagement feature, a secondary coupler assembly, a first jar assembly, and a second jar assembly. The secondary coupler assembly includes a second coupler, a gearset coupled to the second coupler, and a second engagement feature coupled to the gearset. The secondary coupler assembly is operable between a disengaged condition, wherein the second engagement feature is disengaged from the first engagement feature, and an engaged condition, wherein the second engagement feature is engaged with the first engagement feature. The second coupler is generally rotationally stationary during drive shaft rotation at a first speed in the disengaged condition of the secondary coupler assembly, and the second coupler rotates at a second speed that is less than the first speed during drive shaft rotation at the first speed in the engaged condition of the secondary coupler assembly.

20 Claims, 12 Drawing Sheets

(56) References Cited

U.S. PATENT DOCUMENTS

| | | | |
|---|---|---|---|
| 9,901,215 B2 | 2/2018 | Rosenzweig | |
| 10,458,520 B2 | 10/2019 | Brunner et al. | |
| 10,823,262 B2 | 11/2020 | Brunner et al. | |
| 2012/0167712 A1* | 7/2012 | Cheung | A47J 43/08 74/650 |
| 2018/0149238 A1* | 5/2018 | Brunner | A47J 43/085 |

FOREIGN PATENT DOCUMENTS

| | | | |
|---|---|---|---|
| EP | 3488743 A1 | 5/2019 | |
| GB | 2449869 A | 12/2008 | |
| GB | 2454172 A | 5/2009 | |
| WO | 2013090424 A2 | 6/2013 | |

* cited by examiner

COUNTERTOP APPLIANCE

BACKGROUND OF THE DISCLOSURE

The present disclosure generally relates to a countertop appliance and, more specifically, to a countertop appliance that includes a secondary coupler assembly.

SUMMARY OF THE DISCLOSURE

According to one aspect of the present disclosure, a countertop appliance includes a base, a drive shaft, a first coupler, a first engagement feature, a secondary coupler assembly, a first jar assembly, and a second jar assembly. The base has a motor disposed therein. The drive shaft is coupled to the motor, and the motor is configured to drive rotation of the drive shaft at a first speed. The first coupler is coupled to the drive shaft. The first engagement feature is coupled to the drive shaft between the motor and the first coupler. The secondary coupler assembly includes a second coupler, a gearset, and a second engagement feature. The gearset is operably coupled to the second coupler. The second engagement feature is operably coupled to the gearset. The secondary coupler assembly is operable between a disengaged condition and an engaged condition. In the disengaged condition of the secondary coupler assembly, the second engagement feature is disengaged from the first engagement feature. In the engaged condition of the secondary coupler assembly, the second engagement feature is engaged with the first engagement feature. The second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly. The first jar assembly includes a first receptacle and a first attachment assembly coupled to the first receptacle. The first jar assembly is operable between a first mounted condition and a first removed condition. In the first mounted condition, the first jar assembly is mounted to the base and the secondary coupler assembly is in the disengaged condition. In the first removed condition, the first jar assembly is removed from the base. The second jar assembly includes a second receptacle and a second attachment assembly coupled to the second receptacle. The second jar assembly is operable between a second mounted condition and second removed condition. In the second mounted condition, the second jar assembly is mounted to the base such that the secondary coupler assembly is in the engaged condition In the second removed condition, the second jar assembly is removed from the base, such that the secondary coupler assembly is in the disengaged condition.

According to another aspect of the present disclosure, a countertop appliance includes a base, a drive shaft, a first coupler, a first engagement feature, and a secondary coupler assembly. The base has a motor disposed therein. The drive shaft is coupled to the motor, and the motor is configured to drive rotation of the drive shaft at a first speed. The first coupler is coupled to the drive shaft. The first engagement feature is coupled to the drive shaft between the motor and the first coupler. The secondary coupler assembly includes a second coupler, a gearset, and a second engagement feature. The gearset is operably coupled to the second coupler. The second engagement feature is operably coupled to the gearset. The secondary coupler assembly is operable between a disengaged condition and an engaged condition. In the disengaged condition of the secondary coupler assembly, the second engagement feature is disengaged from the first engagement feature. In the engaged condition of the secondary coupler assembly, the second engagement feature is engaged with the first engagement feature. The second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly.

According to yet another aspect of the present disclosure, a countertop appliance includes a base, a drive shaft, a first coupler, a first engagement feature, a secondary coupler assembly, and a jar assembly. The base has a motor disposed therein. The draft shaft is coupled to the motor, and the motor is configured to drive rotation of the drive shaft at a first speed. The first coupler is coupled to the drive shaft. The first engagement feature is coupled to the drive shaft between the motor and the first coupler. The secondary coupler assembly includes a second coupler, a gearset, and a second engagement feature. The gearset is operably coupled to the second coupler. The second engagement feature is operably coupled to the gearset. The secondary coupler assembly is operable between a disengaged condition and an engaged condition. In the disengaged condition of the secondary coupler assembly, the second engagement feature is disengaged from the first engagement feature. In the engaged condition of the secondary coupler assembly, the second engagement feature is engaged with the first engagement feature. The second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly. The jar assembly is operable between a mounted condition and a removed condition. In the mounted condition, the jar assembly is mounted to the base and the secondary coupler assembly is in the engaged condition. In the removed condition, the jar assembly is removed from the base and the secondary coupler is in the disengaged condition.

These and other features, advantages, and objects of the present disclosure will be further understood and appreciated by those skilled in the art by reference to the following specification, claims, and appended drawings.

Figure 1:
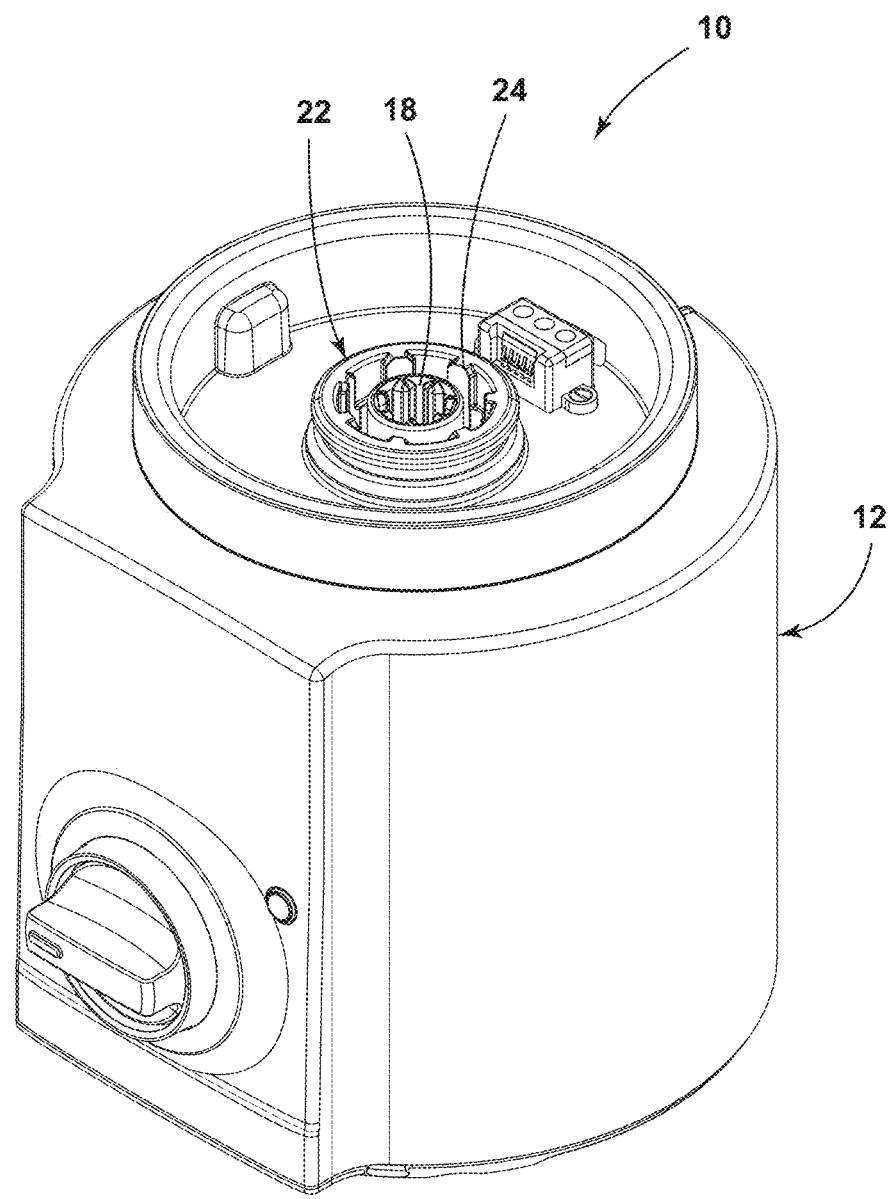
FIG. 1 is a top perspective view of a base of a countertop appliance.

The components in the figures are not necessarily to scale, emphasis instead being placed upon illustrating the principles described herein.

DETAILED DESCRIPTION

The present illustrated embodiments reside primarily in combinations of apparatus components related to a countertop appliance. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

It is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that an article or apparatus that comprises a list of elements does not include only those elements but may include other elements not expressly listed or inherent to such article or apparatus. An element proceeded by "comprises a . . . " does not, without more constraints, preclude the existence of additional identical elements in the article or apparatus that comprises the element.

Referring now to FIGS. 1-12, reference numeral 10 generally designates a countertop appliance. The countertop appliance 10 includes a base 12 that has a motor 14 disposed therein. A drive shaft 16 is coupled to the motor 14. The motor 14 is configured to drive rotation of the drive shaft 16 at a first speed. A first coupler 18 is coupled to the drive shaft 16. A first engagement feature 20 is coupled to the drive shaft 16 between the motor 14 and the first coupler 18. The countertop appliance 10 further includes a secondary coupler assembly 22. The secondary coupler assembly 22 includes a second coupler 24, a gearset 26 operably coupled to the second coupler 24, and a second engagement feature 28 that is operably coupled to the gearset 26. The secondary coupler assembly 22 is operable between a disengaged condition, wherein the second engagement feature 28 is disengaged from the first engagement feature 20, and an engaged condition, wherein the second engagement feature 28 is engaged with the first engagement feature 20. The second coupler 24 is generally rotationally stationary during rotation of the drive shaft 16 at the first speed in the disengaged condition of the secondary coupler assembly 22. The second coupler 24 rotates at a second speed that is less than the first speed during rotation of the drive shaft 16 at the first speed in the engaged condition of the secondary coupler assembly 22. The countertop appliance 10 further includes a first jar assembly 30A. The first jar assembly 30A includes a first receptacle 32A and a first attachment assembly 34A coupled to the first receptacle 32A. The first jar assembly 30A is operable between a first mounted condition, wherein the first jar assembly 30A is mounted to the base 12 and the secondary coupler assembly 22 is in the disengaged condition, and a first removed condition, wherein the first jar assembly 30A is removed from the base 12. The countertop appliance 10 further includes a second jar assembly 30B. The second jar assembly 30B includes a second receptacle 32B and a second attachment assembly 34B coupled to the second receptacle 32B. The second jar assembly 30B is operable between a second mounted condition, wherein the second jar assembly 30B is mounted to the base 12 such that the secondary coupler assembly 22 is in the engaged condition, and a second removed condition, wherein the second jar assembly 30B is removed from the base 12 such that the secondary coupler assembly 22 is in the disengaged condition.

Referring now to FIGS. 1-5, the countertop appliance 10 includes the base 12. The motor 14 is disposed within the base 12, such that the base 12 houses the motor 14. The drive shaft 16 is coupled to the motor 14 of the countertop appliance 10, and the motor 14 is configured to drive rotation of the drive shaft 16. In various implementations, the motor 14 is configured to drive rotation of the drive shaft 16 at a first speed, as described further herein.

Figure 2:
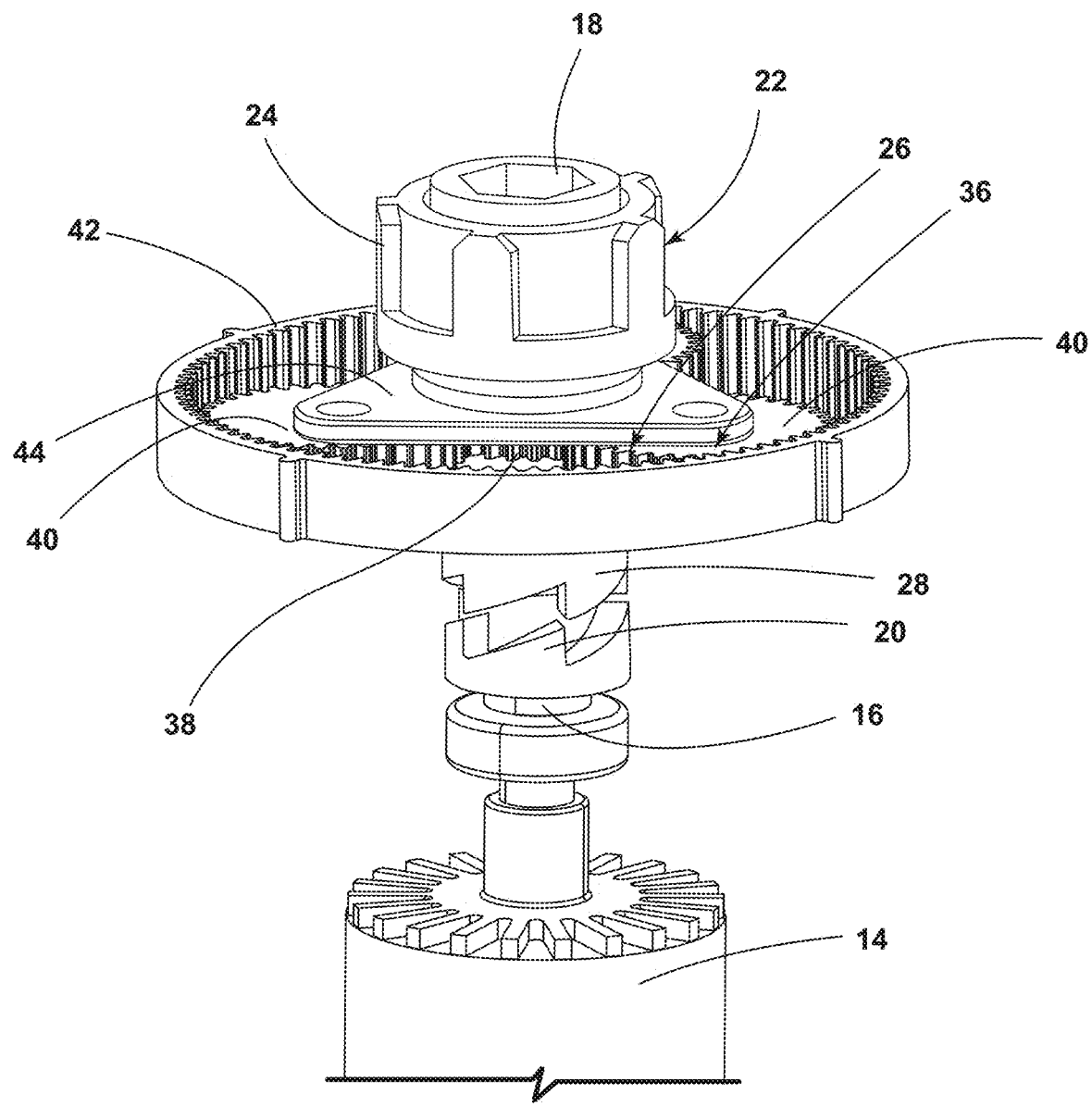
FIG. 2 is a top perspective view of a motor, a drive shaft, a first engagement feature, and a secondary coupler assembly of a countertop appliance.
Figure 3:
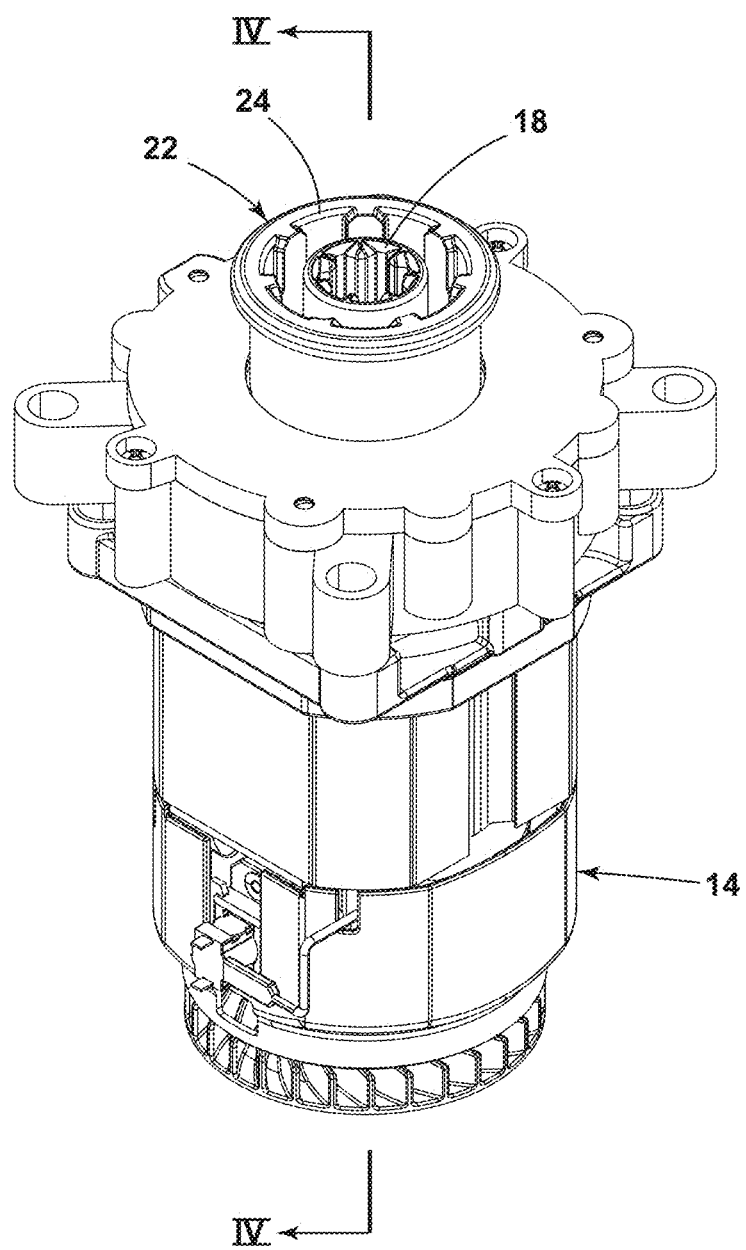
FIG. 3 is a top perspective view of a motor, a first coupler, and a secondary coupler assembly of a countertop appliance.

As illustrated in FIG. 2, the first coupler 18 is coupled to the drive shaft 16. In various implementations, the first coupler 18 may be coupled to a portion of the drive shaft 16 that is distal from the motor 14. It is contemplated that the drive shaft 16 may include a plurality of components, in some implementations. The countertop appliance 10 further includes the first engagement feature 20. The first engagement feature 20 can be coupled to the drive shaft 16 between the motor 14 and the first coupler 18, as illustrated in FIG. 2.

Figure 4:
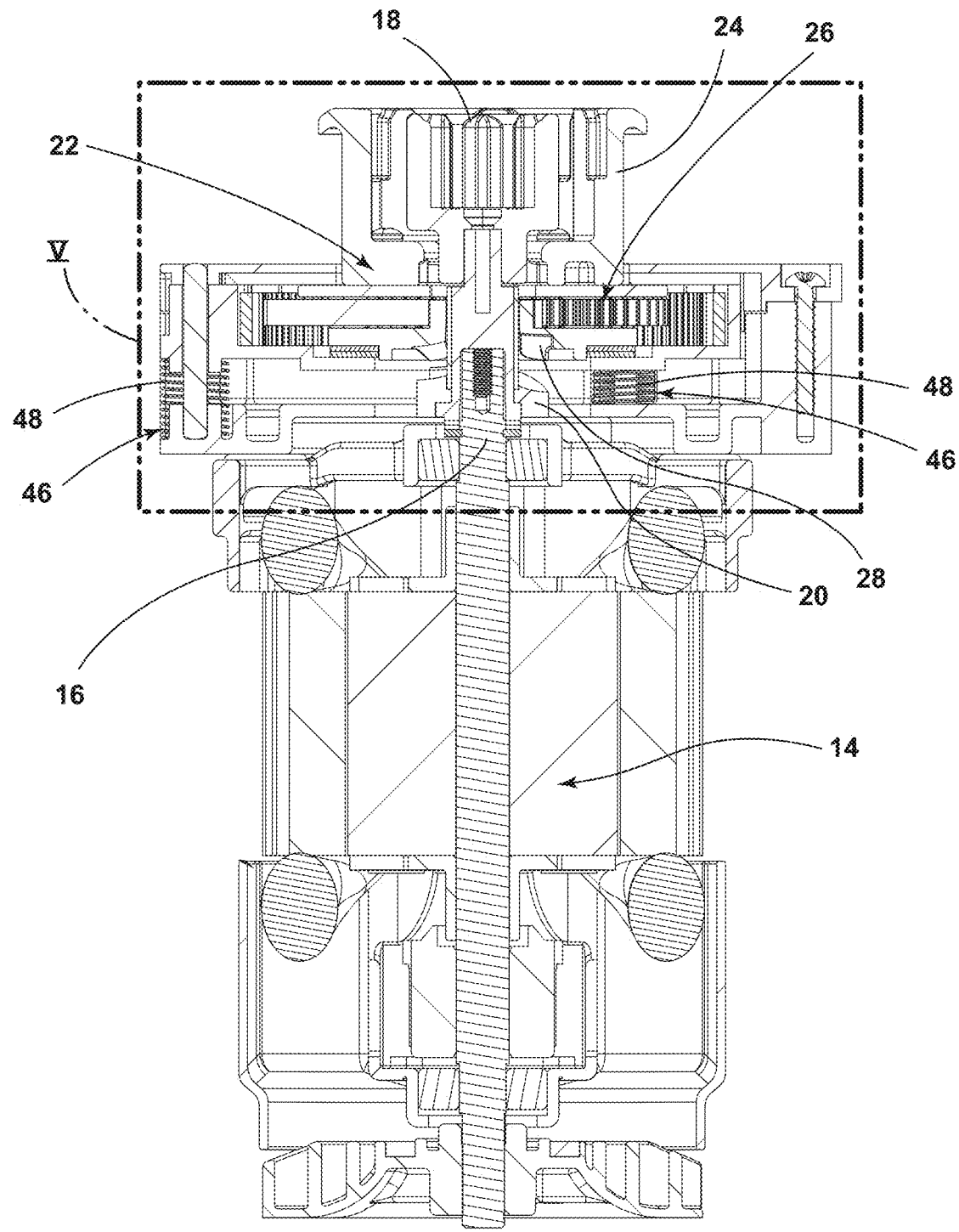
FIG. 4 is a cross-sectional view of the portion of the countertop appliance illustrated in FIG. 3 taken through line IV-IV.
Figure 5:
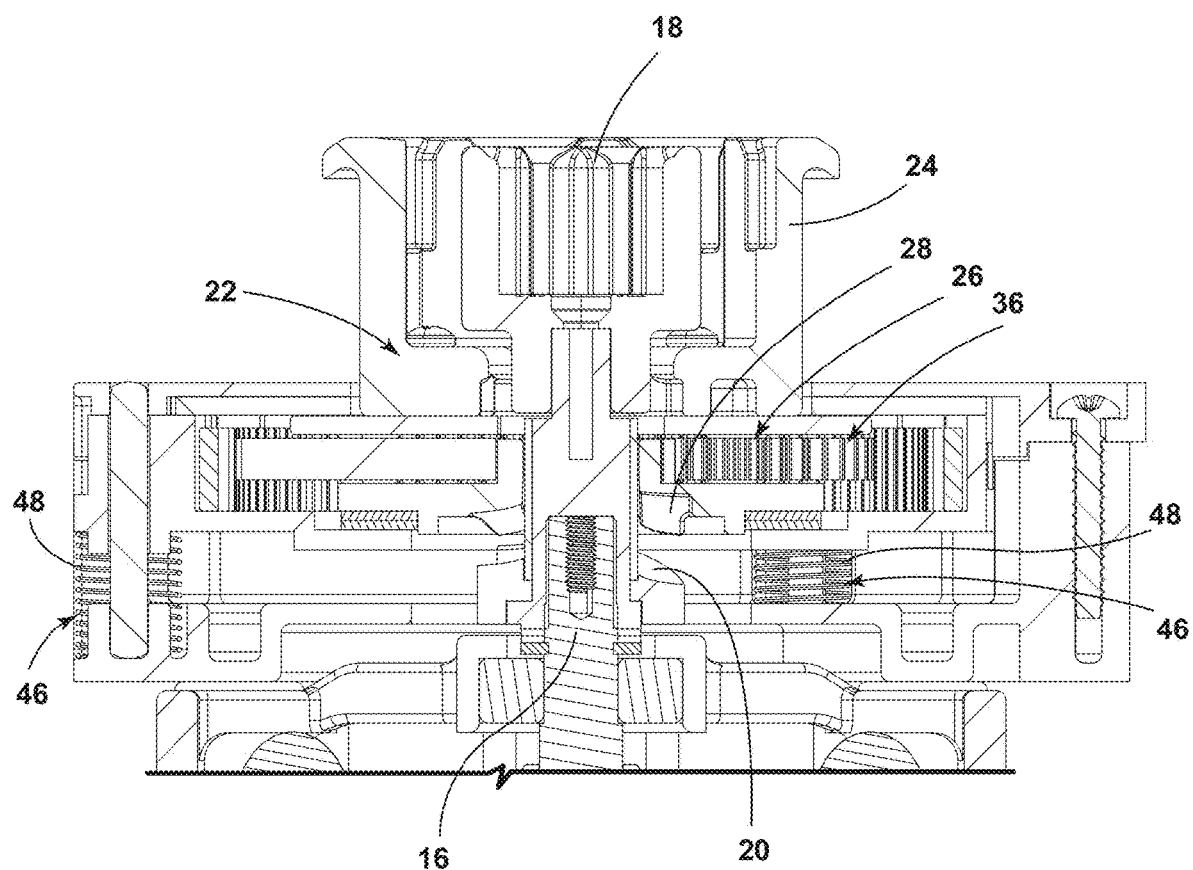
FIG. 5 is an enlarged cross-sectional view of area V illustrated in FIG. 4.

Referring still to FIGS. 1-5, the countertop appliance 10 includes the secondary coupler assembly 22. The secondary coupler assembly 22 can include the second coupler 24, the gearset 26, and the second engagement feature 28. In various implementations, the gearset 26 can be operably coupled to the second engagement feature 28, and the second coupler 24 can be operably coupled to the gearset 26. In some implementations, rotation of the second engagement feature 28 drives the gearset 26, which in turn rotates the second coupler 24 at a speed that is slower than the speed of rotation of the second engagement feature 28. As illustrated in FIGS. 2, 4, and 5, the gearset 26 is positioned vertically between the second engagement feature 28 and the second coupler 24. The second coupler 24 can be positioned proximate to the first coupler 18. For example, as illustrated in FIGS. 2, 4, and 5, the second coupler 24 is disposed about the first coupler 18, such that the first coupler 18 is at least partially nested within the second coupler 24.

Referring still to FIGS. 1-5, the gearset 26 of the secondary coupler assembly 22 can be a planetary gearset 36, in some implementations. For example, as illustrated in FIG. 2, the gearset 26 is a planetary gearset 36 that includes a sun gear 38, a plurality of planet gears 40, and a ring gear 42. The planetary gearset 36 further includes a carrier 44 that is coupled to the planetary gears 38, 40, 42 of the planetary gearset 36. In operation, the sun gear 38 is operably coupled with the second engagement feature 28, such that the sun gear 38 rotates with the second engagement feature 28. Rotation of the sun gear 38 causes rotation of the plurality of planet gears 40 and revolution of the planet gears 40 within the ring gear 42. The carrier 44 coupled to the planetary gears 38, 40, 42 rotates as the planet gears 40 revolve. A second coupler 24 is operably coupled to the carrier 44, such that the second coupler 24 rotates with the carrier 44. In some implementations, the sun gear 38 and the second engagement feature 28 can be integrally coupled to each other. In other words, the sun gear 38 and the second engagement feature 28 may be portions of a single unitary body. It is contemplated that the secondary coupler assembly 22 can include additionally components, in various implementations.

Referring now to FIGS. 2-5, the secondary coupler assembly 22 is operable between the disengaged condition and the engaged condition. In the disengaged condition of the secondary coupler assembly 22, the second engagement feature 28 is disengaged from the first engagement feature 20, as illustrated in FIGS. 2 and 5. In operation of the countertop appliance 10, the second coupler 24 is generally rotationally stationary during rotation of the drive shaft 16 at the first speed in the disengaged condition of the secondary coupler assembly 22. Accordingly, in the disengaged condition of the secondary coupler assembly 22, the second coupler 24 may remain generally stationary as rotation of the first coupler 18 coupled to the drive shaft 16 is driven by the motor 14 at the first speed. In the engaged condition of the secondary coupler assembly 22, the second engagement feature 28 is engaged with the first engagement feature 20. In operation of the countertop appliance 10, the second coupler 24 rotates at a second speed that is less than the first speed during rotation of the drive shaft 16 at the first speed in the engaged condition of the secondary coupler assembly 22. As such, in the engaged condition of the secondary coupler assembly 22, rotation of the drive shaft 16 by the motor 14 at the first speed causes the first coupler 18, which is coupled to the drive shaft 16, to rotate at the first speed, and the second coupler 24 to rotate at the second speed that is less than the first speed. As described herein, the gearset 26 can transfer the first speed of rotation input via the second engagement feature 28 to the second speed of rotation output by the second coupler 24.

In various implementations, the first coupler 18 can rotate at the first speed during rotation of the drive shaft 16 at the first speed in the engaged condition of the secondary coupler assembly 22 and in the disengaged condition of the secondary coupler assembly 22. In some embodiments, the second speed of the second coupler 24 is between about 200 revolutions per minute and about 10,000 revolutions per minute. In some implementations, the first speed of the first coupler 18 is greater than about 15,000 revolutions per minute. For example, the first speed of rotation of the first coupler 18 can be between about 17,000 revolutions per minute and about 30,000 revolutions per minute. Various first and/or second speeds of rotation are contemplated. Further, it is contemplated that the motor 14 of the countertop appliance 10 may be operable at different speeds. For example, the motor 14 may be operable between a low speed mode and a high speed mode, in some embodiments.

Referring now to FIGS. 4 and 5, the countertop appliance 10 can include a biasing feature 46. The biasing feature 46 can be coupled to the secondary coupler assembly 22 and configured to bias the secondary coupler assembly 22 away from the disengaged condition. A variety of types of biasing features 46 are contemplated. For example, the biasing feature 46 may comprise a compression spring 48. In various embodiments, the countertop appliance 10 can include a plurality of biasing features 46. For example, in the embodiment illustrated in FIG. 5, a plurality of compression springs 48 are operably coupled to the secondary coupler assembly 22 and are configured to bias the secondary coupler assembly 22 away from the disengaged condition.

Figure 6:
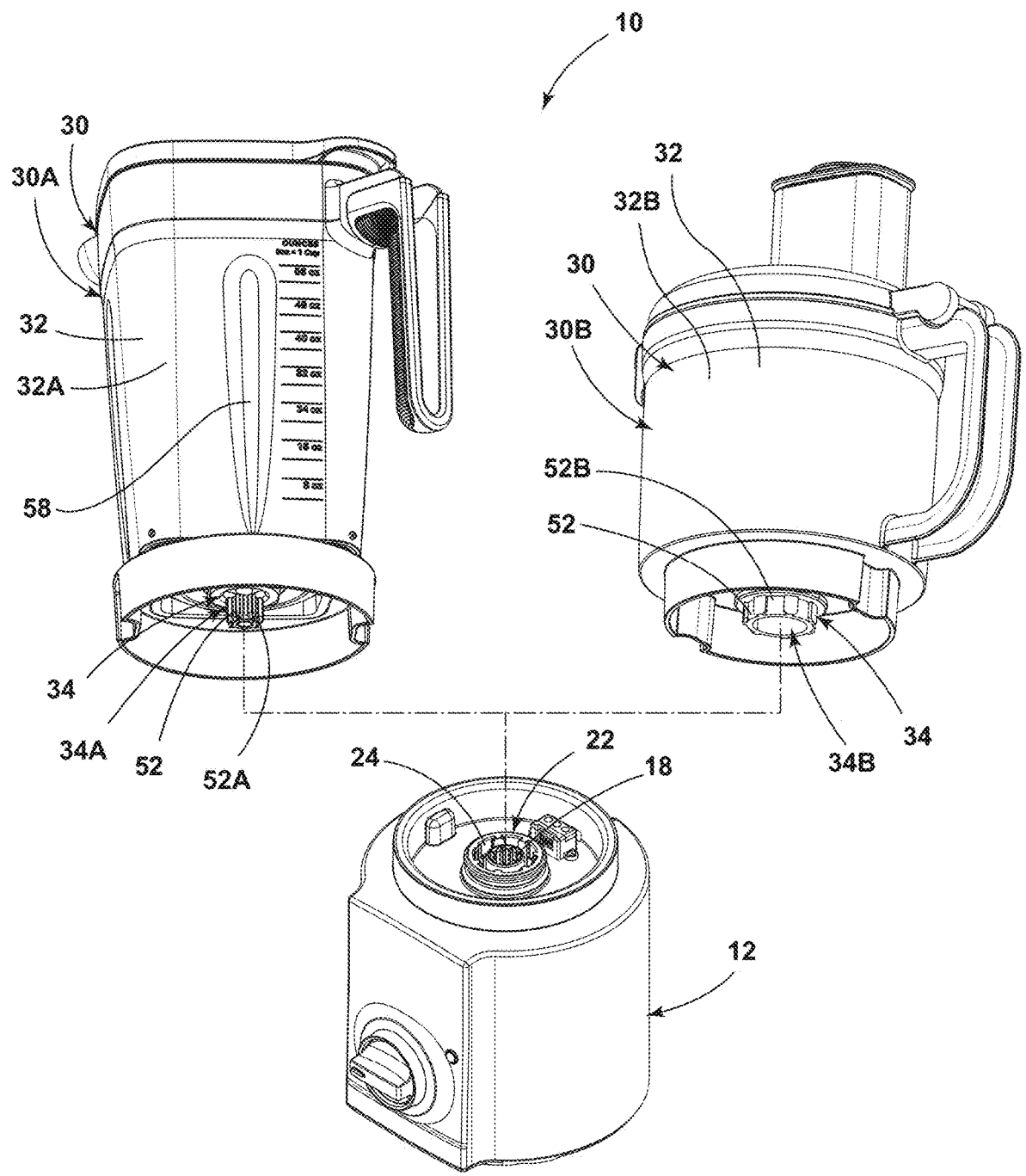
FIG. 6 is a side perspective view of a countertop appliance that includes a base, a first jar assembly, and a second jar assembly.

Referring now to FIGS. 6-12, the countertop assembly 10 includes a jar assembly 30. The jar assembly 30 is operable between a mounted condition, wherein the jar assembly 30 is mounted to the base 12 and the secondary coupler assembly 22 is in the engaged condition, and a removed condition, wherein the jar assembly 30 is removed from the base 12 and the secondary coupler assembly 22 is in the disengaged condition. In some implementations, the countertop appliance 10 can include a plurality of jar assemblies 30. For example, the countertop appliance 10 can include the first jar assembly 30A and the second jar assembly 30B, as illustrated in FIG. 6 and described further herein.

Figure 8:
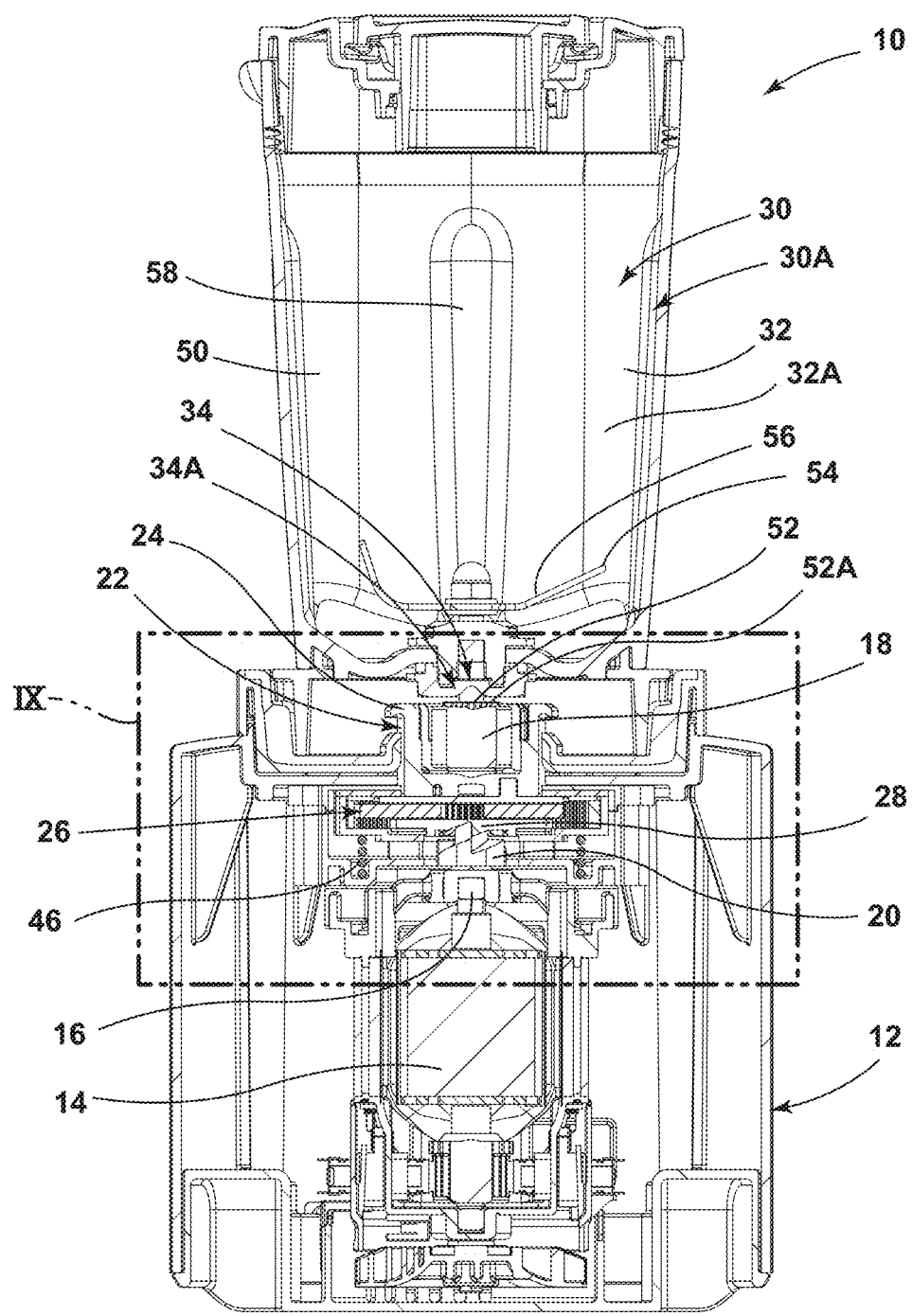
FIG. 8 is a cross-sectional view of the countertop appliance of FIG. 7 taken at line VIII-VIII.

The jar assembly 30 can include a receptacle 32. The receptacle 32 can define an interior receiving space 50 for receiving food therein. The jar assembly 30 can include at least one attachment assembly 34. The attachment assembly 34 may be coupled to the receptacle 32, in various embodiments. The attachment assembly 34 includes an attachment feature 52 that is configured to be operably attached to at least one of the second coupler 24 and the first coupler 18 in the mounted condition of the jar assembly 30, as described further herein. In various embodiments, the attachment feature 52 of the attachment assembly 34 is operable between an attached condition, wherein the attachment feature 52 is engaged with at least one of the first coupler 18 and the second coupler 24, and a detached condition, wherein the attachment feature 52 is disengaged from the at least one of the first coupler 18 and the second coupler 24. In some implementations, the attachment assembly 34 can include at least one blade 54 that is operably coupled to the attachment feature 52, such that rotation of the attachment feature 52 causes rotation of the at least one blade 54. For example, as illustrated in FIG. 8, the attachment assembly 34 includes a blender blade 56 that is operably coupled to the attachment feature 52 and disposed within the interior receiving space 50 defined by the receptacle 32 of the jar assembly 30. In various implementations, the attachment feature 52 of the attachment assembly 34 is positioned outside of the interior receiving space 50 defined by the receptacle 32. It is contemplated that the attachment assembly 34 can include one or more additional components, in various implementations. For example, the attachment assembly 34 may include a base plate that is configured to engage with the receptacle 32 of the jar assembly 30 to provide a bottom to the interior receiving space 50 defined by the receptacle 32.

Referring still to FIGS. 6-12, in some implementations, the countertop appliance 10 includes the first attachment assembly 34A and the second attachment assembly 34B. The first attachment assembly 34A includes a first attachment feature 52A that is operable between a first attached condition and a first detached condition. In the first attached condition, the first attachment feature 52A is engaged with the first coupler 18, such that rotation of the first coupler 18 causes rotation of the first attachment feature 52A. In the first detached condition, the first attachment feature 52A is disengaged from the first coupler 18. The second attachment assembly 34B includes a second attachment feature 52B that is operable between a second attached condition and a second detached condition. In the second attached condition, the second attachment feature 52B is engaged with the second coupler 24, such that rotation of the second coupler 24 causes rotation of the second attachment feature 52B. In the second detached condition of the second attachment feature 52B, the second attachment feature 52B is disengaged from the second coupler 24. In some implementations, movement of the second attachment feature 52B from the second detached condition to the second attached condition causes the secondary coupler assembly 22 to enter the engaged condition, as described further herein.

It is contemplated that, in some implementations, the first and second attachment assemblies 34A, 34B may each be selectively couplable to a single receptacle 32 of a jar assembly 30. In some embodiments, the first attachment assembly 34A may correspond with the first jar assembly 30A, and the second attachment assembly 34B may correspond with the second jar assembly 30B, as illustrated in FIGS. 6-12. In the embodiment illustrated in FIG. 6, the first jar assembly 30A includes the first receptacle 32A and the first attachment assembly 34A coupled to the first receptacle 32A. Further, the second jar assembly 30B includes the second receptacle 32B and the second attachment assembly 34B coupled to the second receptacle 32B. In various embodiments, the first jar assembly 30A is configured for blending applications, and the second jar assembly 30B is configured for food processing applications. For example, as illustrated in FIG. 6, the first receptacle 32A of the first jar assembly 30A includes ribs 58 and a non-circular horizontal cross-sectional shape, both of which can encourage uniform blending. Further, the second receptacle 32B includes a generally circular horizontal cross-sectional outline shape that is suitable for food processing applications.

Figure 7:
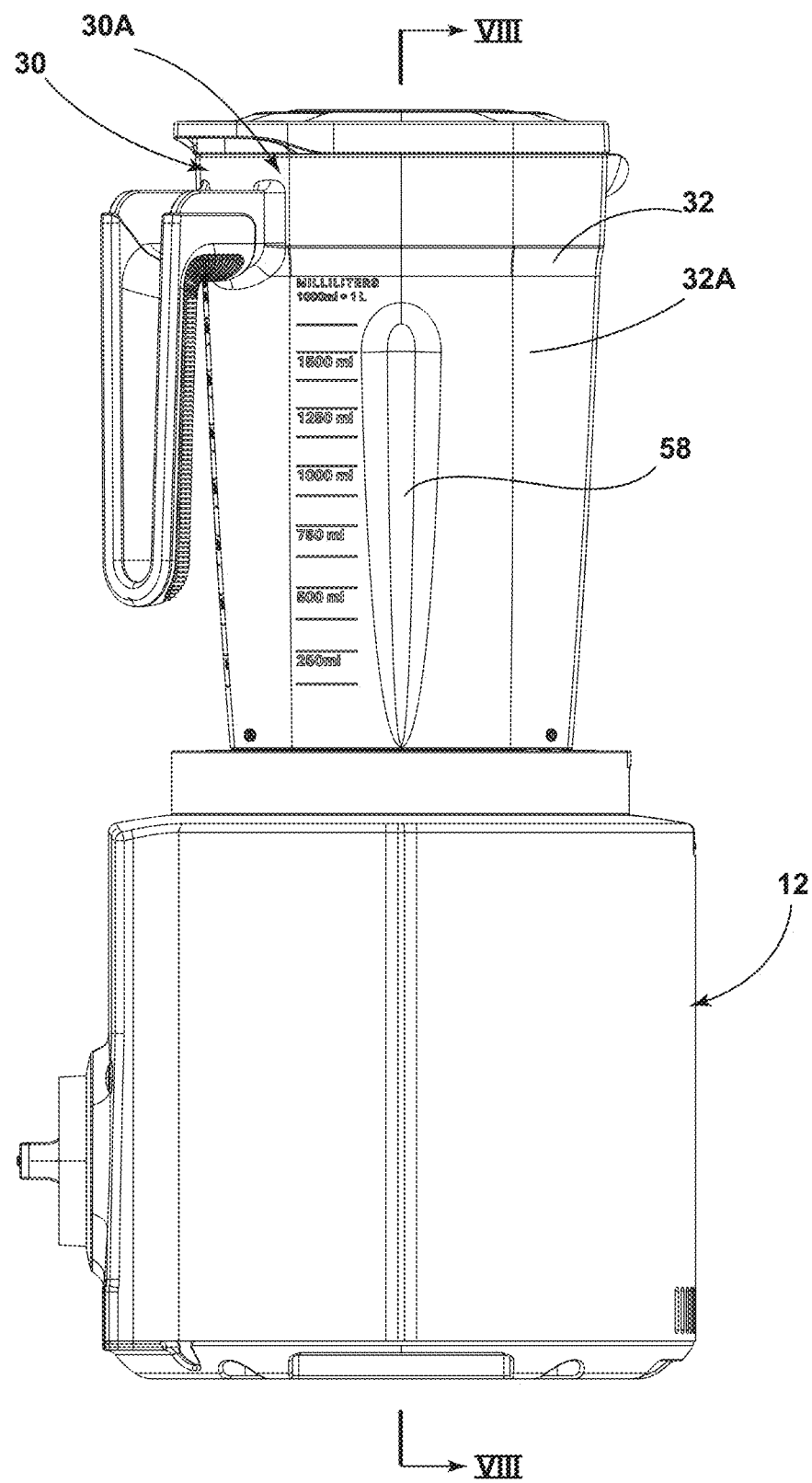
FIG. 7 is a side elevational view of a countertop appliance that includes a base and a first jar assembly mounted to the base.
Figure 9:
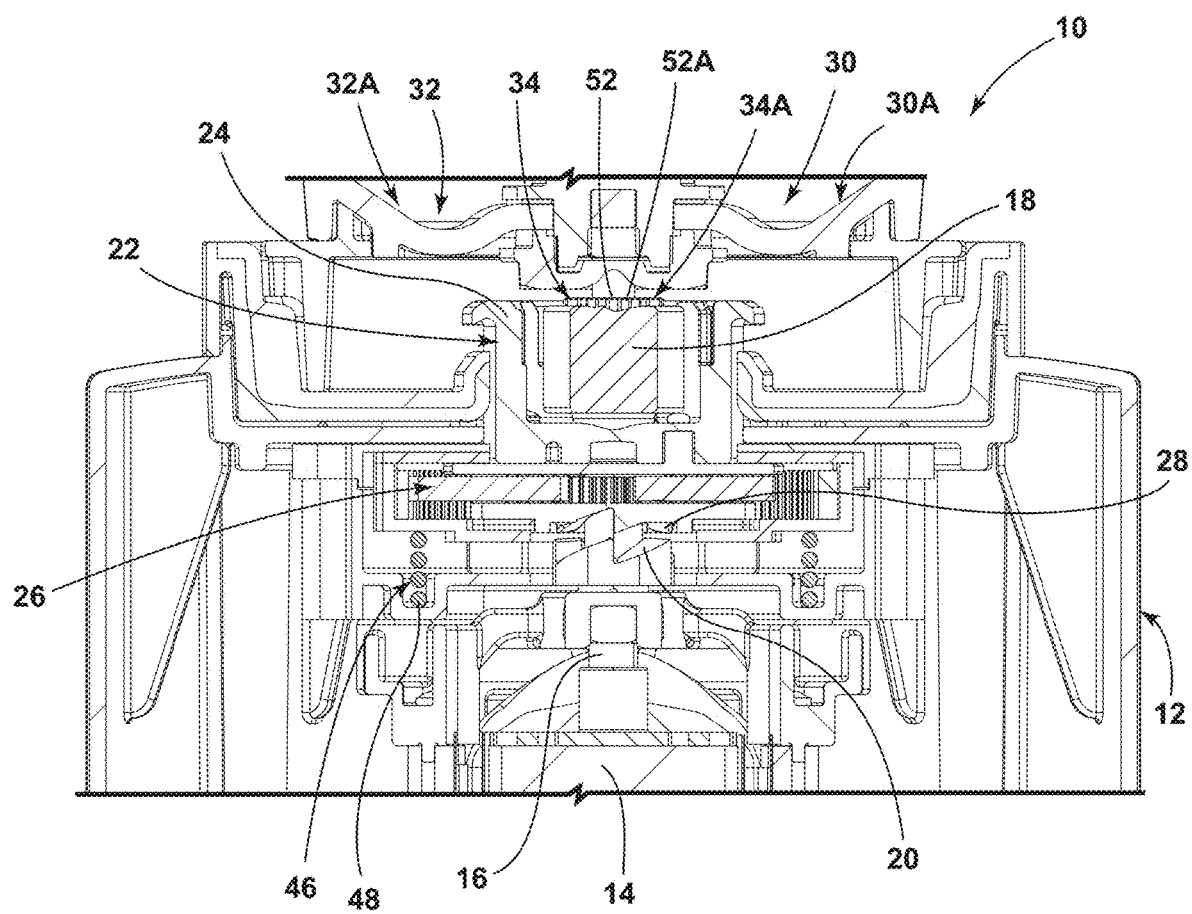
FIG. 9 is an enlarged cross-sectional view of the countertop appliance of FIG. 7 illustrating area IX of FIG. 8.

Referring now to FIGS. 6-9, the first jar assembly 30A is operable between a first mounted condition, as illustrated in FIGS. 7-9, and a first removed condition, as illustrated in FIG. 6. As illustrated in FIG. 6, in the first removed condition of the first jar assembly 30A, the first attachment feature 52A of the first attachment assembly 34A is in the first detached condition, such that the first attachment feature 52A is disengaged from the first coupler 18 of the countertop appliance 10. In the first mounted condition of the first jar assembly 30A, the first attachment feature 52A of the first attachment assembly 34A is in the first attached condition, such that the first attachment feature 52A is engaged with the first coupler 18, as illustrated in FIGS. 8 and 9. As such, rotation of the first coupler 18, as driven by the motor 14 via the drive shaft 16 coupled to the first coupler 18, causes rotation of the first attachment feature 52A, which may, in turn, cause rotation of at least one blade 54 disposed within the interior receiving space 50 defined by the first receptacle 32A. Further, the rotation of the drive shaft 16, the first coupler 18, the first attachment feature 52A, and the at least one blade 54 may each be at the first speed. As illustrated in FIGS. 8 and 9, in the first mounted condition of the first jar assembly 30A and the corresponding first attached condition of the first attachment feature 52A, the secondary coupler assembly 22 is in the disengaged condition, such that the second engagement feature 28 is not engaged with the first engagement feature 20. Thus, rotation of the drive shaft 16 by the motor 14 at the first speed is not transferred to the secondary coupler assembly 22 via the first engagement feature 20 coupled to the drive shaft 16, such that the second coupler 24 of the secondary coupler assembly 22 is generally rotationally stationary as the first coupler 18 rotates at the first speed.

Figure 10:
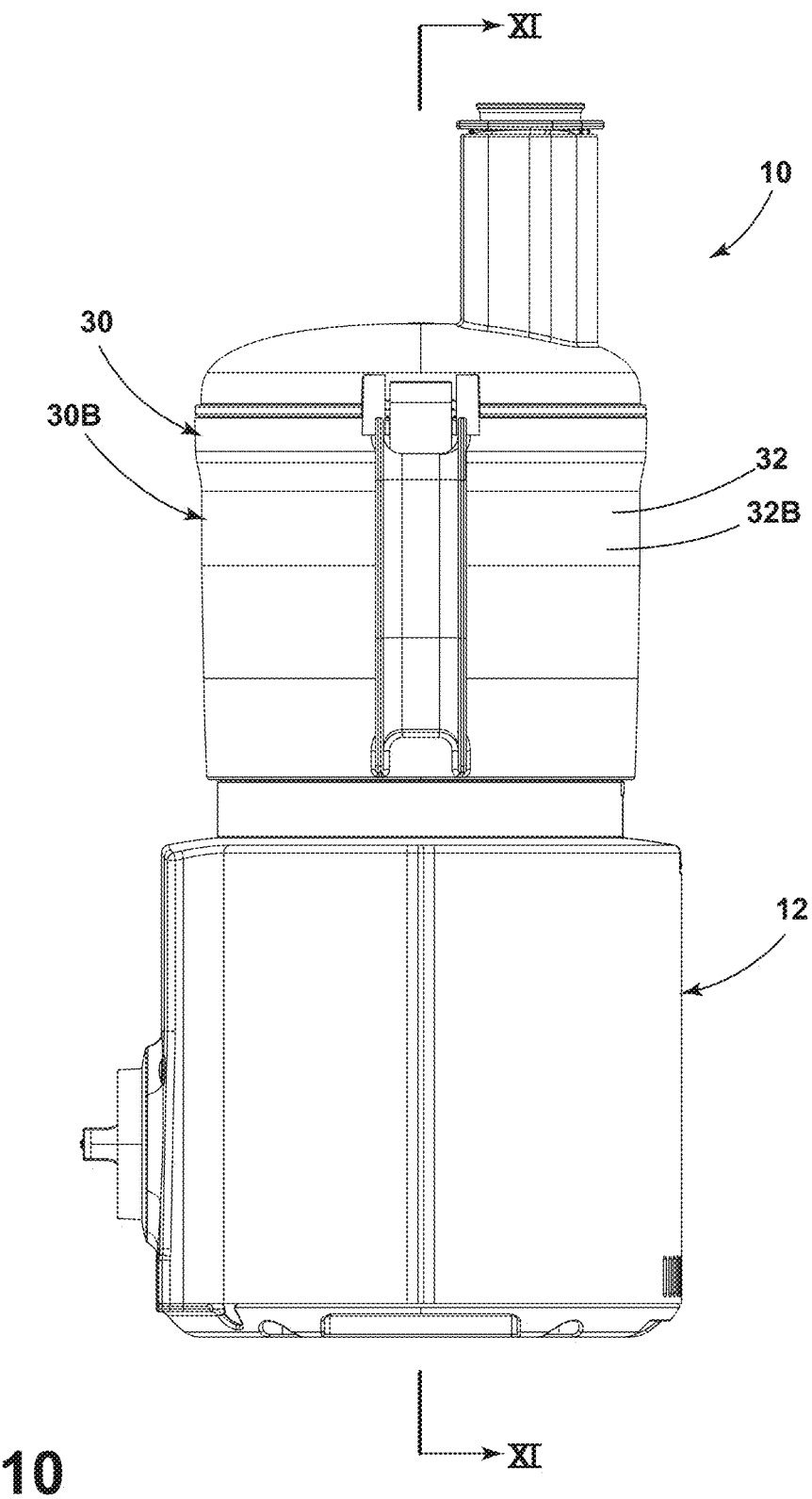
FIG. 10 is a side elevational view of a countertop appliance that includes a base and a second jar assembly coupled to the base.
Figure 11:
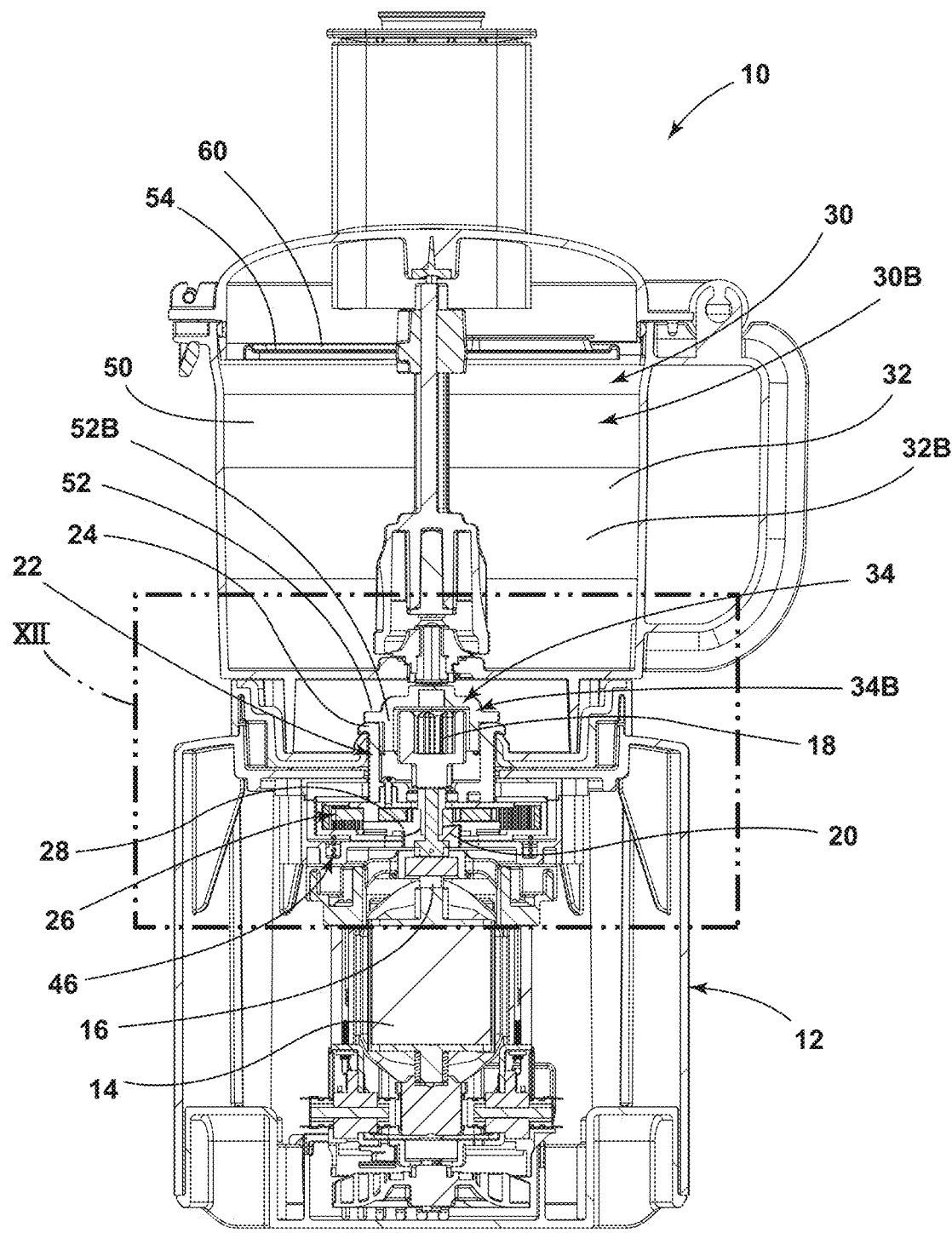
FIG. 11 is a cross-sectional view of the countertop appliance of FIG. 10 taken at line XI-XI.
Figure 12:
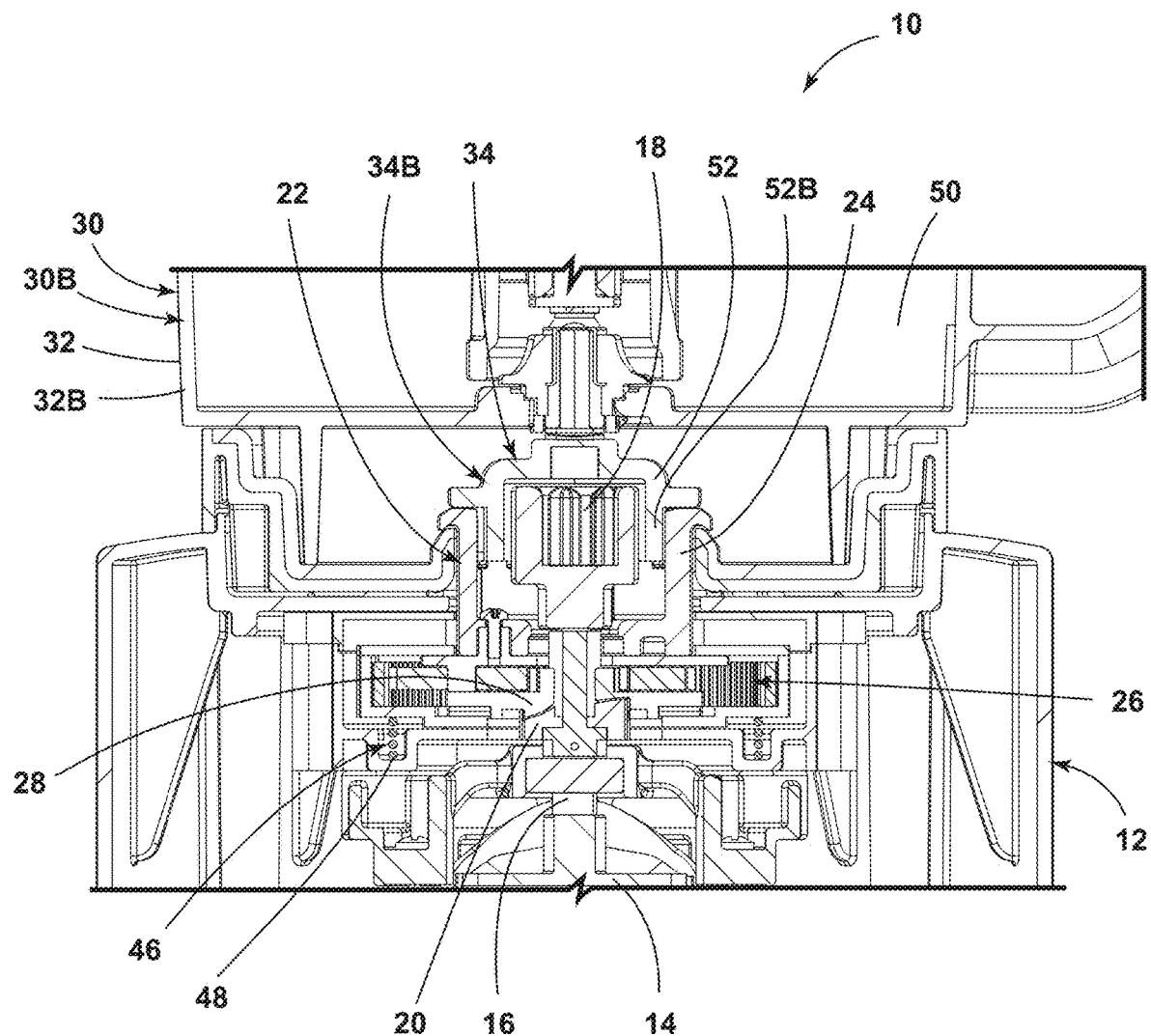
FIG. 12 is an enlarged cross-sectional view of the countertop appliance of FIG. 10 illustrating area XII of FIG. 11.

Referring now to FIGS. 6 and 10-12, the second jar assembly 30B is operable between a second mounted condition, as illustrated in FIGS. 10-12, and a second removed condition, as illustrated in FIG. 6. In the embodiment illustrated in FIG. 6, in the second removed condition of the second jar assembly 30B, the second attachment feature 52B of the second attachment assembly 34B is in the second detached condition, such that the second attachment feature 52B is disengaged from the second coupler 24 of the countertop appliance 10. In the second mounted condition of the second jar assembly 30B, the second attachment feature 52B of the second attachment assembly 34B is in the second attached condition, such that the second attachment feature 52B is engaged with the second coupler 24, as illustrated in FIGS. 11 and 12.

Referring now to FIGS. 6-12, movement of the second jar assembly 30B from the second removed condition to the second mounted condition and/or movement of the second attachment feature 52B from the second detached condition to the second attached condition may cause the secondary coupler assembly 22 to move from the disengaged condition to the engaged condition. For example, as illustrated in FIGS. 8 and 9, wherein the second jar assembly 30B is not in the second mounted condition and the second attachment feature 52B is not in the second attached condition, the secondary coupler assembly 22 is in the disengaged condition, wherein the second engagement feature 28 is not engaged with the first engagement feature 20. As illustrated in FIGS. 11 and 12, wherein the second jar assembly 30B is in the second mounted condition and the second attachment feature 52B is in the second attached condition, the secondary coupler assembly 22 is in the engaged condition. The position of the second coupler 24 in the engaged condition of the secondary coupler assembly 22 (illustrated in FIG. 12) is vertically downward of the position of the second coupler 24 in the disengaged condition of the secondary coupler assembly 22 (illustrated in FIG. 9). Further, the position of the second engagement feature 28 in the engaged condition of the secondary coupler assembly 22 (illustrated in FIG. 12) is vertically downward of the position of the second coupler 24 in the disengaged condition of the secondary coupler assembly 22 (illustrated in FIG. 9). The vertical offset of the second engagement feature 28 of the secondary coupler assembly 22 in the engaged condition of the secondary coupler assembly 22 allows the second engagement feature 28 to engage the first engagement feature 20, as illustrated in FIG. 12.

In various implementations, a portion of the second jar assembly 30B may forcibly contact a portion of the secondary coupler assembly 22 as the second jar assembly 30B is moved to the second mounted condition to prompt movement of the secondary coupler assembly 22 to the engaged condition. For example, as illustrated in FIG. 12, a portion of the second attachment feature 52B contacts a portion of the second coupler 24 of the secondary coupler assembly 22, as the second jar assembly 30B is moved to the second mounted condition, and the contact causes the secondary coupler assembly 22 to move against the biasing force exerted by the biasing feature 46 to the engaged condition.

In the second mounted condition of the second jar assembly 30B, wherein the second attachment feature 52B is in the second attached condition and the secondary coupler assembly 22 is in the engaged condition, rotation of the drive shaft 16 by the motor 14 at the first speed causes rotation of the first coupler 18 at the first speed and rotation of the second coupler 24 at a second speed that is less than the first speed. The second attachment feature 52B, being engaged with the second coupler 24, rotates at the second speed to rotate a food processing implement 60 within the interior receiving space 50 of the second receptacle 32B.

According to an aspect of the present disclosure, a countertop appliance includes a base, a drive shaft, a first coupler, a first engagement feature, a secondary coupler assembly, a first jar assembly, and a second jar assembly. The base has a motor disposed therein. The drive shaft is coupled to the motor, and the motor is configured to drive rotation of the drive shaft at a first speed. The first coupler is coupled to the drive shaft. The first engagement feature is coupled to the drive shaft between the motor and the first coupler. The secondary coupler assembly includes a second coupler, a gearset, and a second engagement feature. The gearset is operably coupled to the second coupler. The second engagement feature is operably coupled to the gearset. The secondary coupler assembly is operable between a disengaged condition and an engaged condition. In the disengaged condition of the secondary coupler assembly, the second engagement feature is disengaged from the first engagement feature. In the engaged condition of the secondary coupler assembly, the second engagement feature is engaged with the first engagement feature. The second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly. The first jar assembly includes a first receptacle and a first attachment assembly coupled to the first receptacle. The first jar assembly is operable between a first mounted condition and a first removed condition. In the first mounted condition, the first jar assembly is mounted to the base and the secondary coupler assembly is in the disengaged condition. In the first removed condition, the first jar assembly is removed from the base. The second jar assembly includes a second receptacle and a second attachment assembly coupled to the second receptacle. The second jar assembly is operable between a second mounted condition and second removed condition. In the second mounted condition, the second jar assembly is mounted to the base such that the secondary coupler assembly is in the engaged condition In the second removed condition, the second jar assembly is removed from the base, such that the secondary coupler assembly is in the disengaged condition.

According to another aspect, a biasing feature is coupled to the secondary coupler assembly and configured to bias the secondary coupler assembly away from the disengaged condition.

According to another aspect, the first coupler rotates at the first speed during rotation of the drive shaft at the first speed in the engaged condition of the secondary coupler assembly and the disengaged condition of the secondary coupler assembly.

According to another aspect, the second speed of the second coupler is between about 200 revolutions per minute and about 10,000 revolutions per minute.

According to another aspect, the first speed of the first coupler is greater than about 15,000 revolutions per minute.

According to another aspect, the gearset is a planetary gearset.

According to another aspect, the first attachment assembly includes a first attachment feature that is operable between a first attached condition and a first detached condition. In the first attached condition, the first attachment feature is engaged with the first coupler, such that the rotation of the first coupler causes rotation of the first attachment feature and at least one blade operably coupled to the first attachment feature. In the first detached condition, the first attachment feature is disengaged from the first coupler. The first attachment feature is in the first attached condition in the first mounted condition of the first jar assembly and the first attachment feature is in the first detached condition in the first removed condition of the first jar assembly.

According to another aspect, the second attachment assembly includes a second attachment feature that is operable between a second attached condition and a second detached condition. In the second attached condition, the second attachment feature is engaged with the second coupler, such that rotation of the second coupler causes rotation of the second attachment feature. In the second detached condition, the second attachment feature is disengaged from the second coupler. The second attachment feature is in the second attached condition in the second mounted condition of the second jar assembly, and the second attachment feature is in the second detached condition in the second removed condition of the second jar assembly.

According to yet another aspect of the present disclosure, a countertop appliance includes a base, a drive shaft, a first coupler, a first engagement feature, and a secondary coupler assembly. The base has a motor disposed therein. The drive shaft is coupled to the motor, and the motor is configured to drive rotation of the drive shaft at a first speed. The first coupler is coupled to the drive shaft. The first engagement feature is coupled to the drive shaft between the motor and the first coupler. The secondary coupler assembly includes a second coupler, a gearset, and a second engagement feature. The gearset is operably coupled to the second coupler. The second engagement feature is operably coupled to the gearset. The secondary coupler assembly is operable between a disengaged condition and an engaged condition. In the disengaged condition of the secondary coupler assembly, the second engagement feature is disengaged from the first engagement feature. In the engaged condition of the secondary coupler assembly, the second engagement feature is engaged with the first engagement feature. The second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly.

According to another aspect, a biasing feature is coupled to the secondary coupler assembly and configured to bias the secondary coupler assembly away from the disengaged condition.

According to another aspect, the first coupler rotates at the first speed during rotation of the drive shaft at the first speed in the engaged condition of the secondary coupler assembly and the disengaged condition of the secondary coupler assembly.

According to another aspect, the second speed of the second coupler is between about 200 revolutions per minute and about 10,000 revolutions per minute.

According to another aspect, the first speed of the first coupler is greater than about 15,000 revolutions per minute.

According to another aspect, the gearset is a planetary gearset.

According to another aspect, a first attachment assembly includes a first attachment feature that is operable between a first attached condition and a first detached condition. In the first attached condition, the first attachment feature is engaged with the first coupler, such that the rotation of the first coupler causes rotation of the first attachment feature. In the first detached condition, the first attachment feature is disengaged from the first coupler.

According to another aspect, a second attachment assembly includes a second attachment feature that is operable between a second attached condition and a second detached condition. In the second attached condition, the second attachment feature is engaged with the second coupler, such that rotation of the second coupler causes rotation of the second attachment feature. In the second detached condition, the second attachment feature is disengaged from the second coupler. Movement of the second attachment assembly from the second detached condition to the second attached condition causes the secondary coupler assembly to enter the engaged condition.

According to another aspect, the first attachment assembly is coupled to a first receptacle and the second attachment assembly is coupled to a second receptacle.

According to yet another aspect of the present disclosure, a countertop appliance includes a base, a drive shaft, a first coupler, a first engagement feature, a secondary coupler assembly, and a jar assembly. The base has a motor disposed therein. The draft shaft is coupled to the motor, and the motor is configured to drive rotation of the drive shaft at a first speed. The first coupler is coupled to the drive shaft. The first engagement feature is coupled to the drive shaft between the motor and the first coupler. The secondary coupler assembly includes a second coupler, a gearset, and a second engagement feature. The gearset is operably coupled to the second coupler. The second engagement feature is operably coupled to the gearset. The secondary coupler assembly is operable between a disengaged condition and an engaged condition. In the disengaged condition of the secondary coupler assembly, the second engagement feature is disengaged from the first engagement feature. In the engaged condition of the secondary coupler assembly, the second engagement feature is engaged with the first engagement feature. The second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly. The jar assembly is operable between a mounted condition and a removed condition. In the mounted condition, the jar assembly is mounted to the base and the secondary coupler assembly is in the engaged condition. In the removed condition, the jar assembly is removed from the base and the secondary coupler is in the disengaged condition.

According to another aspect, the jar assembly includes a receptacle that defines an interior receiving space for receiving food therein.

According to another aspect, the jar assembly includes an attachment assembly coupled to the receptacle and having an attachment feature that is configured to be operably attached to the second coupler in the mounted condition of the jar assembly.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A countertop appliance, comprising:
   a base having a motor disposed therein;
   a drive shaft coupled to the motor, wherein the motor is configured to drive rotation of the drive shaft at a first speed;
   a first coupler coupled to the drive shaft;
   a first engagement feature coupled to the drive shaft between the motor and the first coupler;
   a secondary coupler assembly, comprising:
      a second coupler;
      a gearset operably coupled to the second coupler; and
      a second engagement feature operably coupled to the gearset, wherein the secondary coupler assembly is operable between a disengaged condition, wherein the second engagement feature is disengaged from the first engagement feature, and an engaged condition, wherein the second engagement feature is engaged with the first engagement feature, and wherein the second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly;
a first jar assembly that includes a first receptacle and a first attachment assembly coupled to the first receptacle, the first jar assembly being operable between a first mounted condition, wherein the first jar assembly is mounted to the base and the secondary coupler assembly is in the disengaged condition, and a first removed condition, wherein the first jar assembly is removed from the base; and
a second jar assembly that includes a second receptacle and a second attachment assembly coupled to the second receptacle, the second jar assembly being operable between a second mounted condition, wherein the second jar assembly is mounted to the base such that the secondary coupler assembly is in the engaged condition, and a second removed condition, wherein the second jar assembly is removed from the base, such that the secondary coupler assembly is in the disengaged condition.

2. The countertop appliance of claim 1, further comprising:
a biasing feature coupled to the secondary coupler assembly and configured to bias the secondary coupler assembly away from the disengaged condition.

3. The countertop appliance of claim 1, wherein the first coupler rotates at the first speed during rotation of the drive shaft at the first speed in the engaged condition of the secondary coupler assembly and the disengaged condition of the secondary coupler assembly.

4. The countertop appliance of claim 3, wherein the second speed of the second coupler is between about 200 revolutions per minute and about 10,000 revolutions per minute.

5. The countertop appliance of claim 4, wherein the first speed of the first coupler is greater than about 15,000 revolutions per minute.

6. The countertop appliance of claim 1, wherein the gearset is a planetary gearset.

7. The countertop appliance of claim 1, wherein the first attachment assembly includes a first attachment feature that is operable between a first attached condition, wherein the first attachment feature is engaged with the first coupler, such that the rotation of the first coupler causes rotation of the first attachment feature and at least one blade operably coupled to the first attachment feature, and a first detached condition, wherein the first attachment feature is disengaged from the first coupler, and wherein the first attachment feature is in the first attached condition in the first mounted condition of the first jar assembly and the first attachment feature is in the first detached condition in the first removed condition of the first jar assembly.

8. The countertop appliance of claim 7, wherein the second attachment assembly includes a second attachment feature that is operable between a second attached condition, wherein the second attachment feature is engaged with the second coupler, such that rotation of the second coupler causes rotation of the second attachment feature, and a second detached condition, wherein the second attachment feature is disengaged from the second coupler, and wherein the second attachment feature is in the second attached condition in the second mounted condition of the second jar assembly, and the second attachment feature is in the second detached condition in the second removed condition of the second jar assembly.

9. A countertop appliance, comprising:
a base having a motor disposed therein;
a drive shaft coupled to the motor, wherein the motor is configured to drive rotation of the drive shaft at a first speed;
a first coupler coupled to the drive shaft;
a first engagement feature coupled to the drive shaft between the motor and the first coupler; and
a secondary coupler assembly, comprising:
a second coupler;
a gearset operably coupled to the second coupler; and
a second engagement feature operably coupled to the gearset, wherein the secondary coupler assembly is operable between a disengaged condition, wherein the second engagement feature is disengaged from the first engagement feature, and an engaged condition, wherein the second engagement feature is engaged with the first engagement feature, and wherein the second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly.

10. The countertop appliance of claim 9, further comprising:
a biasing feature coupled to the secondary coupler assembly and configured to bias the secondary coupler assembly away from the disengaged condition.

11. The countertop appliance of claim 9, wherein the first coupler rotates at the first speed during rotation of the drive shaft at the first speed in the engaged condition of the secondary coupler assembly and the disengaged condition of the secondary coupler assembly.

12. The countertop appliance of claim 11, wherein the second speed of the second coupler is between about 200 revolutions per minute and about 10,000 revolutions per minute.

13. The countertop appliance of claim 12, wherein the first speed of the first coupler is greater than about 15,000 revolutions per minute.

14. The countertop appliance of claim 9, wherein the gearset is a planetary gearset.

15. The countertop appliance of claim 9, further comprising:
a first attachment assembly that includes a first attachment feature that is operable between a first attached condition, wherein the first attachment feature is engaged with the first coupler such that the rotation of the first coupler causes rotation of the first attachment feature, and a first detached condition, wherein the first attachment feature is disengaged from the first coupler.

16. The countertop appliance of claim 15, further comprising:
a second attachment assembly that includes a second attachment feature that is operable between a second attached condition, wherein the second attachment feature is engaged with the second coupler such that rotation of the second coupler causes rotation of the second attachment feature, and a second detached condition, wherein the second attachment feature is disengaged from the second coupler, and wherein movement of the second attachment assembly from the second detached condition to the second attached condition causes the secondary coupler assembly to enter the engaged condition.

17. The countertop appliance of claim 16, wherein the first attachment assembly is coupled to a first receptacle and the second attachment assembly is coupled to a second receptacle.

18. A countertop appliance, comprising:
a base having a motor disposed therein;
a drive shaft coupled to the motor, wherein the motor is configured to drive rotation of the drive shaft at a first speed;
a first coupler coupled to the drive shaft;
a first engagement feature coupled to the drive shaft between the motor and the first coupler;
a secondary coupler assembly, comprising:
a second coupler;
a gearset operably coupled to the second coupler; and
a second engagement feature operably coupled to the gearset, wherein the secondary coupler assembly is operable between a disengaged condition, wherein the second engagement feature is disengaged from the first engagement feature, and an engaged condition, wherein the second engagement feature is engaged with the first engagement feature, and wherein the second coupler is generally rotationally stationary during rotation of the drive shaft at the first speed in the disengaged condition of the secondary coupler assembly, and the second coupler rotates at a second speed that is less than the first speed during rotation of the drive shaft at the first speed in the engaged condition of the secondary coupler assembly; and
a jar assembly operable between a mounted condition, wherein the jar assembly is mounted to the base and the secondary coupler assembly is in the engaged condition, and a removed condition, wherein the jar assembly is removed from the base and the secondary coupler is in the disengaged condition.

19. The countertop appliance of claim 18, wherein the jar assembly comprises:
a receptacle that defines an interior receiving space for receiving food therein.

20. The countertop appliance of claim 19, wherein the jar assembly further comprises:
an attachment assembly coupled to the receptacle and having an attachment feature that is configured to be operably attached to the second coupler in the mounted condition of the jar assembly.

* * * * *